W. W. REYNOLDS.
Poises for Scale-Beams.
No. 227,579.  Patented May 11, 1880.
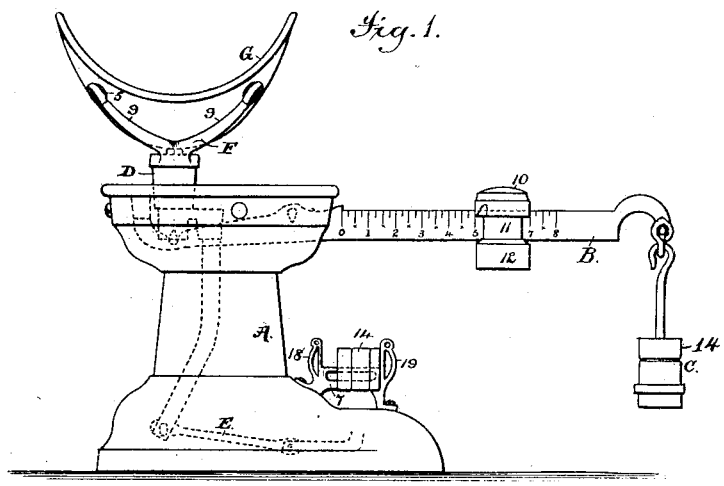
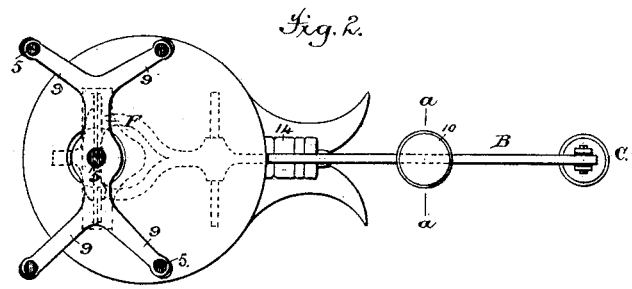
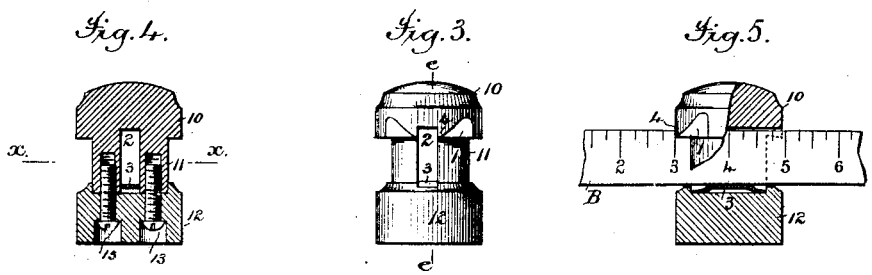
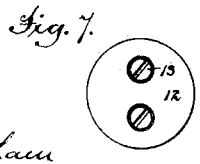

UNITED STATES PATENT OFFICE.

WILLIAM W. REYNOLDS, OF RUTLAND, VERMONT, ASSIGNOR TO THE HOWE SCALE COMPANY, OF SAME PLACE.

POISE FOR SCALE-BEAMS.

SPECIFICATION forming part of Letters Patent No. 227,579, dated May 11, 1880.

Application filed August 9, 1879.

*To all whom it may concern:*

Be it known that I, WILLIAM W. REYNOLDS, of Rutland, county of Rutland, and State of Vermont, have invented certain new and useful Improvements in Counter-Scales, of which the following specification, when taken in connection with the accompanying drawings, is a full, clear, and exact description, sufficient to enable others skilled in the art to make and use the same.

In said drawings, Figure 1 represents, by a side elevation, a scale provided with my improved poise. Fig. 2 represents the same by a plan view. Fig. 3 represents a front elevation, Fig. 4 a sectional elevation on the line *a a*, Fig. 2, Fig. 5 a part-sectional elevation on the line *e e*, Fig. 3, Fig. 6 a sectional plan view on the line *x x*, Fig. 4, and Fig. 7 a bottom-plan view, of the poise.

In its general features this scale does not differ from those of common construction as made for counter use.

It thus consists of a hollow standard or base, A, in which the scale-beam B is suitably pivoted, said beam being graduated on one or both faces, provided with a sliding poise, and carrying at one end a counterpoise, C, while it supports, upon proper pivotal bearings at the opposite end upon its short arm, a vertical post, D, which post, stepped at its lower end upon a centering-lever, E, supports at its upper end a cradle, F, in the arms 9 9 of which rests a scoop, G, adapted to receive the substances to be weighed.

The present invention is directed to the improvement of such scales in their details of construction; and it consists in a novel construction of the poise that slides upon the scale-beam B, all of which will now be particularly described.

Scales of this general class are commonly provided with a number of slotted weights, 14, which are used upon the counterpoise C when a greater weight than that represented by the graduations upon the scale-beam B is to be determined. As these weights are only occasionally used they are commonly piled upon the counter or laid away, and are not infrequently lost or misplaced, greatly to the annoyance of the operator of the scales, which is thus rendered partially inoperative. Moreover, these weights are, when lying loosely about, often gathered up and thrown into the scale scoop or pan for temporary storage, by which disposition of them the thin scoop is bruised, dented, disfigured, and otherwise injured.

To obviate the inconvenience resulting from the use of these loose weights 14, I provide for their reception and storage, when not in use upon the counterpoise, a holder or rack, which consists of a bar, 7, suited to receive the weights upon it, which bar is supported by end pieces or bearers, 18 19, that are fixed upon the base or standard A. This rack or holder is thus an integral part of the scale itself, and affords a means for the proper storage of such weights as are not in use, which is conveniently located for the reception of the weights or for their recovery when required for use. By forming this rack or holder as a part of the scale itself all necessary devices for its perfect operation are connected together and may be bodily moved from place to place, as is frequent with these portable scales.

The poise for the weight-beam as heretofore constructed has commonly been a solid cast body recessed to slide upon the beam. This poise, after having one end of the beam entered through it, is kept thereon either by the pivotal bearing supporting the counterpoise or by a stop-pin fastened in the beam so as to project from both faces thereof. As thus constructed the poise depends upon gravity to hold it in place, or is supplied with a spring held in a recess bored in its body and closed by a plug. In order to provide such a poise with an indicator and properly expose the graduations of the scale-beam below said indicator, a great portion of its body has to be cut away. Such a poise is a costly structure, clumsy in appearance, inconvenient in use, and sometimes imperfect in its operation.

I construct this poise in two parts, the one consisting of a head, 10, from which depends a contracted body, 11, in which is provided a slot or recess, 2, whereby it is adapted to stride the beam B and slide thereon. The other part of this poise is constituted by the base 12, which is provided with a recessed seat, in which the lower end of the body 11 is adapted to fit. This base 12 is fastened to the body 11 by means of screws 13, which pass through suitable sockets in said base and are entered into tapped holes in the body 11. The slot or recess 2 extends partially into the head 10, and the parts of said head at one side adjacent to the slot or recess 2 are recessed or cut away, as at 1, so as to form the pointer 4 and expose the marks of graduation at which it is to be adjusted.

In order to hold this poise at any point of its adjustment upon a scale-beam having smooth bearing-surfaces, upon which said poise slides, I provide in the recess in its base 12 a spring, 57, which, having its ends seated against the walls of said recess, bears upward against the under surface of said beam B, and thus impinges upon said beam with a pressure determined by its strength and the degree to which it is compressed by the screws 13, whereby a sufficient friction is created between the bearings of said poise and the beam to hold it stationary at any point to which it may be moved on said beam.

What I claim is—

1. A poise for scales consisting of a body, 11, having an enlarged head, as 10, recessed to fit upon the scale-beam, and a base, as 12, said parts being secured together by means of screws, as 13, substantially as described.

2. A poise for scales consisting of a centraled body, 11, an enlarged head, 10, and a base, 12, said body being recessed, as at 2, to receive the scale-beam, said head being cut away, as at 1, to form an indicator, as 4, and said base recessed to receive the body 11 and sustain the spring 3, substantially as described.

In testimony whereof I have signed my name to this specification in the presence of two subscribing witnesses.

WM. W. REYNOLDS.

Witnesses:
L. DANIELS,
N. KELLOGG.